(No Model.)
J. H. MINER.
SAW MILL DOG.
No. 380,916. Patented Apr. 10, 1888.
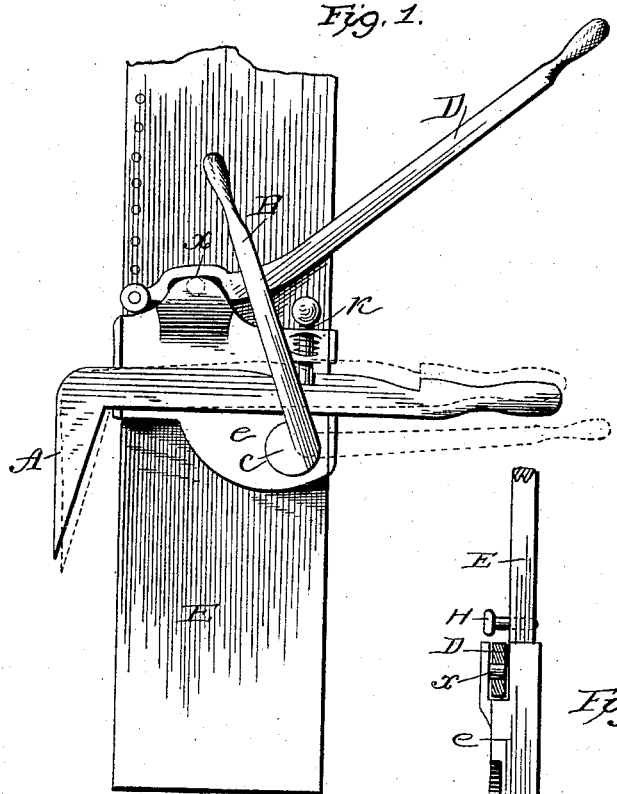
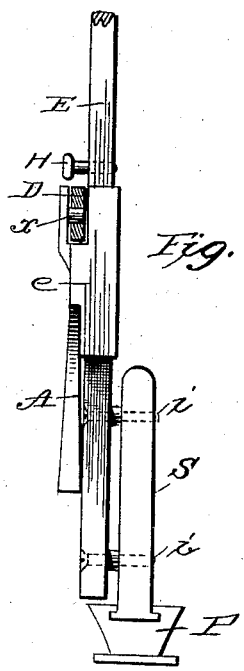
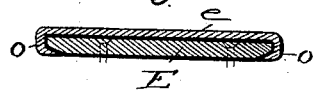
Attest:
Walter Donaldson
F. L. Middleton.
Inventor
J. H. Miner.
by Ellis Spear.
Atty.

UNITED STATES PATENT OFFICE.

JAMES HENRY MINER, OF BATON ROUGE, LOUISIANA.

SAW-MILL DOG.

SPECIFICATION forming part of Letters Patent No. 380,916, dated April 10, 1888.

Application filed November 14, 1887. Serial No. 255,143. (No model.)

*To all whom it may concern:*

Be it known that I, JAMES HENRY MINER, of Baton Rouge, in the parish of East Baton Rouge and State of Louisiana, have invented a new and useful Improvement in Saw-Mill Dogs; and I do hereby declare that the following is a full, clear, and exact description of the same.

My invention is an improvement in saw-mill dogs; and the particular feature of it relates to the mechanism for bringing the point of the dog in toward the face of the knee after the dog has been inserted in the cant.

In the accompanying drawings, Figure 1 represents a front elevation, Fig. 2 a side elevation, and Fig. 3 a cross-section, of the improved apparatus.

In the drawings, S represents an ordinary standard or knee attached to a head-block, P. Bolted to it by countersunk bolts $i$, with interposed thimbles, is a guide-standard, E. On this guide-standard slides a frame, $e$, which carries the dog A. The dog slides in guides on the side of the frame in the ordinary manner; but the rear guide is higher than the vertical depth of the shank of the dog, so that the handle or rear end of the dog-shank may be raised, as shown in dotted lines in Fig. 1. The upper end of the shank has notches, by which it is held in adjustable position, and in tipping up it fulcrums on the front guide, so that as it tips up the point of the dog is shifted inward toward the knee or standard, as shown in dotted lines. In a lug on the frame near the edge is a vertical pin, K, having a handle by which it may be lifted, and it is normally pressed down by a spring to engage with the notch in the upper edge of the shank. The spring holds the pin in engagement, but allows the shank to be lifted without displacing the pin, the spring yielding sufficiently for that purpose. Underneath the shank is pivoted an eccentric, C, on the frame, with the periphery of the eccentric bearing upon the under side of the shank. A lever, B, is attached to the eccentric for revolving it on its pivot. When the lower edge of the shank rests upon the low part of the eccentric, the shank is down and the point of the dog is thrown out; but when the lever B is drawn to the rear in the direction of the arrow the high part of the eccentric is brought under the shank, forcing it upward and crowding the point of the dog inward toward the knee or standard. The eccentric serves also to hold the point of the dog in the position indicated by the dotted lines in Fig. 1. The frame can be shifted up and down, being held to the guide-standard by flanges $o$ $o$, Fig. 4, and the space between the guide-standard and the standard S allows it to move up or down the whole length of the standard E. The standard E is provided on the rear edge with a row of holes, F, into which a pin, H, is inserted to connect the lever D to the guide-standard. A pin, X, is fixed in an offset in the frame, passing through a slot in the lever D, by means of which the frame is forced down to force the dog into the cant. By means of the row of holes in the pin H the frame may be set at any suitable height, according to the size of the cant, and when so set the depression of the lever D forces the dog into the cant.

Although the eccentric C is the simplest and most effective means for raising the shank of the dog, other suitable means may be substituted therefor, either to raise the shank of the dog or to hold it when raised.

I claim as my invention—

1. In combination, the frame, the dogs fitted to guides in said frame, said guides being deeper at the rear than the depth of the shank of the dog, whereby the said dog is permitted an adjustment to throw the point in or out, a spring-pin engaging with notches in the upper side of the dog, and an independent lifting and holding device arranged beneath the dog, substantially as described.

2. In combination, a frame arranged to slide on the guide-standard, having guides made to allow sliding movement of the dog, and also tipping movement to draw the point toward the standard, a spring-pin fitting notches in the upper edge of the shank of the dog, and an eccentric and lever independent of the dog for raising and holding the shank thereof, substantially as described.

3. In combination, the guide-standard having a row of holes, the frame sliding thereon, the lever slotted to receive a pin set in the frame, a pin, as H', passing through the end of the said lever and through one of the holes in the standard, guides in the frame arranged to allow sliding and tipping movement of the dog, a spring-pin fitting notches in the upper edge of the shank of the dog, and a device for lifting and holding the shank, all substantially as described.

In testimony whereof I have signed my name to this specification in the presence of two subscribing witnesses.

JAMES HENRY MINER.

Witnesses:
 JOHN J. WAX,
 JOHN GASS.